United States Patent
Wang

(10) Patent No.: US 8,116,416 B2
(45) Date of Patent: Feb. 14, 2012

(54) METHOD FOR DETERMINING SYNCHRONIZATION CODE UNDER SMIA

(75) Inventor: Wen-Bin Wang, Shengang Township, Changhua County (TW)

(73) Assignee: Altek Corporation, Hsinchu (TW)

( * ) Notice: Subject to any disclaimer, the term of this patent is extended or adjusted under 35 U.S.C. 154(b) by 999 days.

(21) Appl. No.: 12/076,673

(22) Filed: Mar. 21, 2008

(65) Prior Publication Data

US 2009/0157704 A1   Jun. 18, 2009

(30) Foreign Application Priority Data

Dec. 12, 2007   (TW) ................................ 96147430 A

(51) Int. Cl.
*H04L 7/00* (2006.01)
(52) U.S. Cl. ........................................ 375/365; 375/354
(58) Field of Classification Search ................. 375/365, 375/362, 354; 707/100
See application file for complete search history.

(56) References Cited

U.S. PATENT DOCUMENTS

| 4,723,283 | A | * | 2/1988 | Nagasawa et al. | 380/240 |
| 5,313,231 | A | * | 5/1994 | Yin et al. | 345/605 |
| 2002/0165683 | A1 | * | 11/2002 | Lee | 702/77 |
| 2008/0132171 | A1 | * | 6/2008 | Paik | 455/63.1 |
| 2009/0086857 | A1 | * | 4/2009 | Wu | 375/345 |

* cited by examiner

*Primary Examiner* — David C. Payne
*Assistant Examiner* — Brian J Stevens
(74) *Attorney, Agent, or Firm* — Rosenberg, Klein & Lee

(57) ABSTRACT

A method for determining the synchronization code under a standard mobile imaging architecture is provided. This method is essentially to solve any possible error occurring as transferring the images among the mobile devices. If any error is occurred to the transferred bit stream, it will cause fault in the image data. Consequently, the present invention provides an approach to compare every input data with iterative comparison operation, so as to obtain the position of synchronization codes under SMIA. Therefore, the correct synchronization code will solve the possible error translation.

11 Claims, 5 Drawing Sheets

| | | | | | |
|---|---|---|---|---|---|
| **0000 | 00001111 | 11110000 | 00000000 | 0000** | 60 |
| 00000000 | 11111111 | 00000000 | 00000000 | ******* | 601 |
| *0000000 | 01111111 | 10000000 | 00000000 | 0****** | 602 |
| 000000 | 00111111 | 11000000 | 00000000 | 00*** | 603 |
| *00000 | 00011111 | 11100000 | 00000000 | 000** | 604 |
| **0000 | 00001111 | 11110000 | 00000000 | 0000* | 605 |
| ***000 | 00000111 | 11111000 | 00000000 | 00000* | 606 |
| ****00 | 00000011 | 11111100 | 00000000 | 000000 | 607 |
| *******0 | 00000001 | 11111110 | 00000000 | 0000000* | 608 |

METHOD FOR DETERMINING SYNCHRONIZATION CODE UNDER SMIA

BACKGROUND OF THE INVENTION

1. Field of the Invention

A method for determining synchronization code under the Standard Mobile Image Architecture (SMIA), in particular, for using iterative comparison operations to obtain the correct position of the synchronization code, so as to correctly translate the received image data.

2. Description of Related Art

Because of the rapid market growth of mobile phones or other portable devices with camera function, the Standard Mobile Image Architecture (SMIA) provides a standard for transferring image data over mobile devices, wherein the SMIA is an image process architecture specifically applicable on mobile devices, which offers better performance between SMIA-compliant sensor and connected SMIA-compliant host, and specifies elements including housing, mechanical interconnection, functionality, register set and interface.

When transferring images among mobile devices, according the aforementioned SMIA that defines eleven types of image data format, in which synchronization code includes bit codes for the start of a frame, such as SOF (frame start synchronization code); the end of a frame, such as EOF (frame end synchronization code); start bit of the line in an image pixel array, such as SOL (line start synchronization code); and end bit of the line, such as EOL (line end synchronization code). When transmitting, the transmissions of data as well as synchronization code both start from the lowest significant bit (LSB). Refer to Table 1 for each synchronization code, in which SOL, EOL, SOF, EOF and logical channel are specified.

TABLE 1

| Synchronization Code | Value |
| --- | --- |
| Line Start Code (SOL) | $FF_H 00_H 00_H X0_H$ (X: number of channels) |
| Line End Code (EOL) | $FF_H 00_H 00_H X1_H$ |
| Frame Start Code (SOF) | $FF_H 00_H 00_H X2_H$ |
| Frame End Code (EOF) | $FF_H 00_H 00_H X3_H$ |
| Logical Channel | $FF_H 00_H 00_H 0X_H$ to $FF_H 00_H 00_H 7X_H$ |

FIG. 1 shows a frame diagram of the SMIA, which takes a VGA image file as an example, the data shown in the diagram (for VGA format, 480 lines from line 1 to line 480) is the image file data defined between frame end code (EOF) and frame start code (SOF), and a frame blanking period is defined outside the frame; meanwhile, a line blanking is also defined between line end code (EOL) and line start code (SOL).

The arrangement of data in the memory is illustrated in FIG. 2, wherein the transmission of each byte starts from the maximum significant bit (MSB), and the least significant bit (LSB) is the last one transferred. The arrangement in the memory is shown as bits 31-24, 23-16, 15-8 and 7-0; but when transferring image data under SMIA, bit stream thereof is output from the camera module in the mobile device; and before transferring any data, the least significant bit (LSB) will be transferred first, as the bit flow shown in the figure, reversing the positions of MSB and LSB, thus starting from LSB, e.g. 24-31, 16-23, 8-15 and 0-7.

As shown in FIG. 3, in the data received by a receiver, each frame starts from a frame start code (SOF), and ends at a frame end code (EOF), in which each line therein starts from a line start code (SOL) and ends at a line end code (EOL), forming a bit stream configuration illustrated in FIG. 1, wherein the first line start code is replaced by a frame start code, and the last line end code is substituted by a frame end code. The above-mentioned logical channels separate the interlaced data into different data flows, in which there are 0 to 7 channels in quantity.

SUMMARY OF THE INVENTION

In the aforementioned prior art, eleven image data formats all specify number of bits in a single line data. When transferring, upon data number error or even synchronization code error accidentally occurs in a bit flow, the receiving side may not able to translate image data from the bit flow, causing a series of unrecoverable errors in the following steps. In view of this, the present invention provides a decoder which offers secure operations, even when the receiving side encounters data number error or even synchronization code error.

The inventive method of determining synchronization code under SMIA is directed to the aforementioned issues, and provides a solution which, in essential, by means of iteratively using comparison operations, compares the synchronization code of each input data, until synchronization code is correctly matched, hence obtaining correct position of the data, avoiding the occurrence of translation error.

The preferred embodiment includes the following steps. The decoder starts to receive data. Data transmission starts from the LSB; after having entered into the decoder, it is reversed and sorted into the original data type. In order to perform comparison operation onto the synchronization code with LSB first, the present invention reverses it again then stores it into a register. Next, through comparison operations with different offsets, compare the data so as to find the correct synchronization code with LSB first.

The principal embodiment finds the correct synchronization code by means of at most 8 times comparison operations. It is possible to design 8 kinds of comparators; each has a synchronization code with one offset, performing at most 8 different comparison operations, in order to obtain the correct synchronization code position.

DETAILED DESCRIPTION OF THE PREFERRED EMBODIMENTS

Image transmissions among mobile devices are based on a SMIA, in which the image data formats defined therein have a plurality of synchronization codes, including a frame start code (SOF) specifying the frame start position, and a frame end code (EOF) specifying the frame end position, whereas the data in each line of the image being decided by a line start code (SOL) at the start position and a line end code (EOL) at the end position. However, during image transmission, it is inevitable to encounter error situations. A continuously transmitted data flow may result in an entire erroneous condition because of an error in one bit. The inventive method of determining synchronization code is, through iterative comparison operations, compare each data to find the correct position of synchronization code, then translate the image data defined by each synchronization code, avoiding the error caused by a certain bit error.

Since the transmission of image data under SMIA starts from the Least Significant Bit (LSB); i.e. the "LSB first" transmission scheme, thus upon reception at the decoder, the data will be automatically arranged in original bit flow order under SMIA, that is, data with the Maximum Significant Bit (MSB) as the start bit. In order to translate each synchronization code, the present invention compares the synchronization code with LSB first, and because that the bit flow generated by data error or synchronization code error may offset 0 to 7 bits, a synchronization code finder formed by a plurality of comparison circuits is provided so as to locate possible offsets by a plurality of comparison operations, which in the preferred embodiment is 8, including a state of 0 offset.

Due to possible occurrence of error in data number, the bit flow offset varies over time, the aforementioned synchronization code finder thus needs to search once again in terms of every possible offset of in each clock.

Figure 1:
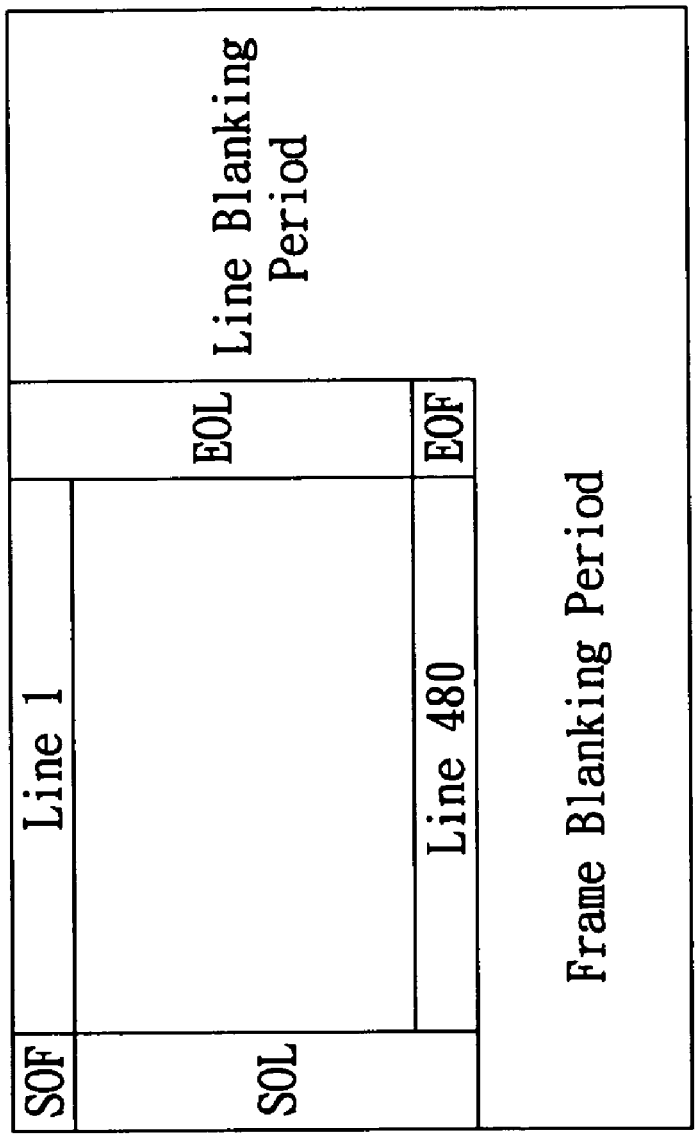
FIG. 1 is an image data diagram of prior art under SMIA.
Figure 2:
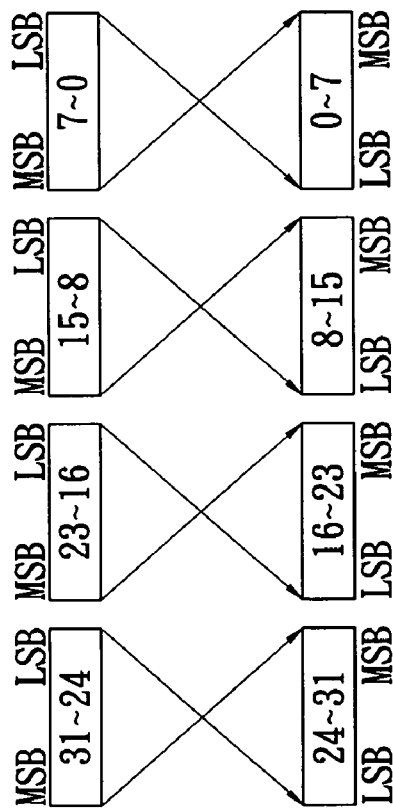
FIG. 2 is a bit flow data conversion diagram of prior art under SMIA.
Figure 3:
FIG. 3 is a bit flow diagram of prior art transferred under SMIA.
Figure 4:
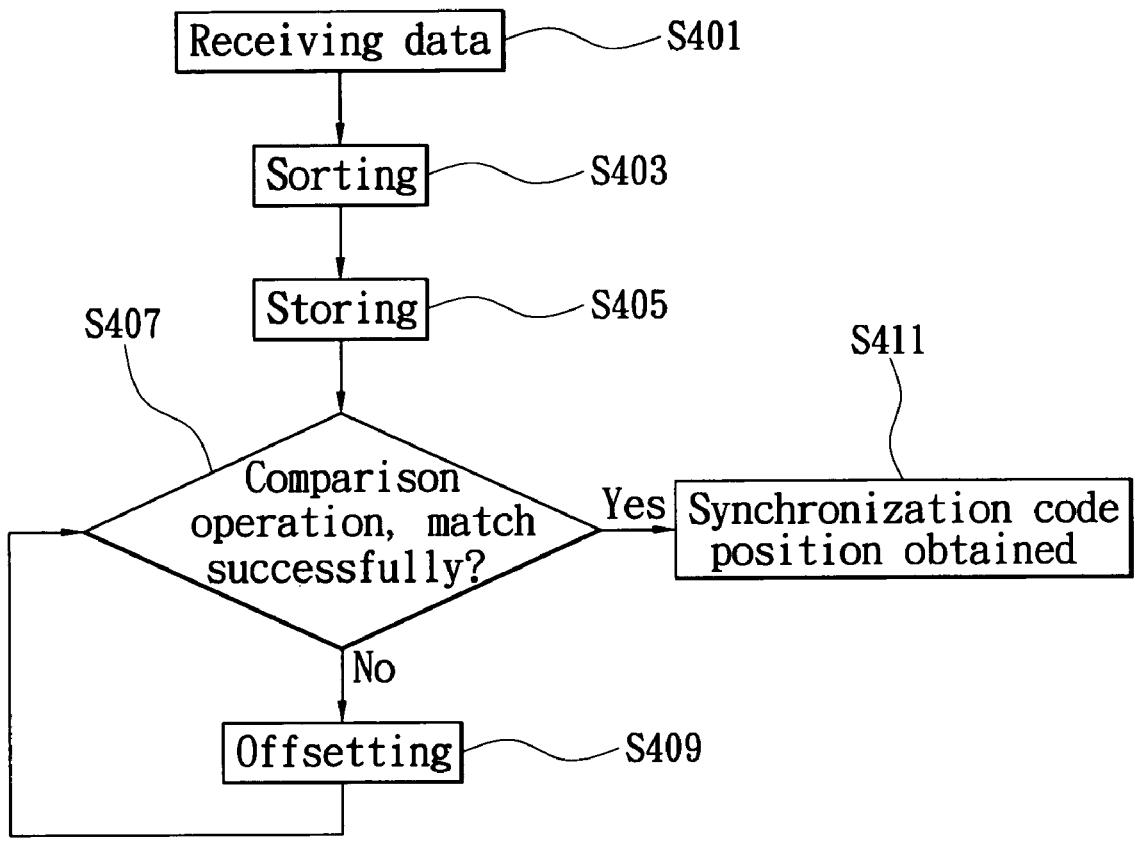
FIG. 4 is a flowchart of the inventive method for determining synchronization code under SMIA.

According to the above-mentioned data offset issues needed to be solved, the inventive method of determining synchronization code can be shown as the flowchart illustrated in FIG. 4, which includes step S401, indicating the decoder starts to receive data, and, under SMIA, data transmission is required to start from the Least Significant Bit (LSB first), thus when arriving at the decoder, it will be automatically reversed in order, recovering into original data type, i.e. the data starting with Maximum Significant Bit (MSB first).

Because that the inventive method of determining synchronization code mainly performs comparison operation based on the synchronization code with LSB first, it is necessary, as step S403, to reverse the received data in order, facilitating the comparison operation in bit flow form with LSB first. Subsequently, as step S405, these bit flows are all stored into storage media like registers, and next, by means of comparison operations with different offsets, search the data for the correct synchronization code with LSB first, as step S407. In practical implementation, it is possible to use a plurality of comparators to execute comparison operations, and within each comparator there exists a built-in set of synchronization code values with possible offsets. Each comparator sequentially performs comparison operations, deciding whether it matches the synchronization code of the LSB in the received incoming data.

Regarding to the workflow concerning the plurality of comparison operations, if the result of the first comparison operation does not match, then perform one bit offset (step S409), conducting the next comparison operation, and determining again if this matches such a offset amount; if not, repeat another bit offset and so on, until the correct synchronization code with LSB first is located, obtaining the correct synchronization code position (step S411). When the correct offset is found, reverse the data into the data format with MSB first, then output it in a data type of byte.

Since the aforementioned preferred embodiment transmits data based on a byte type using 8 bits as one set, the possible offsets ranges from 0 (no offset) to 7 bits of offset, therefore the objective of the present invention is directed not only to search for the correct synchronization code with at most 8 comparison operations, but also designs 8 comparators, each has a synchronization code with one offset condition, performing 8 different comparison operation, so as to locate the correct position of synchronization code.

Figure 5:
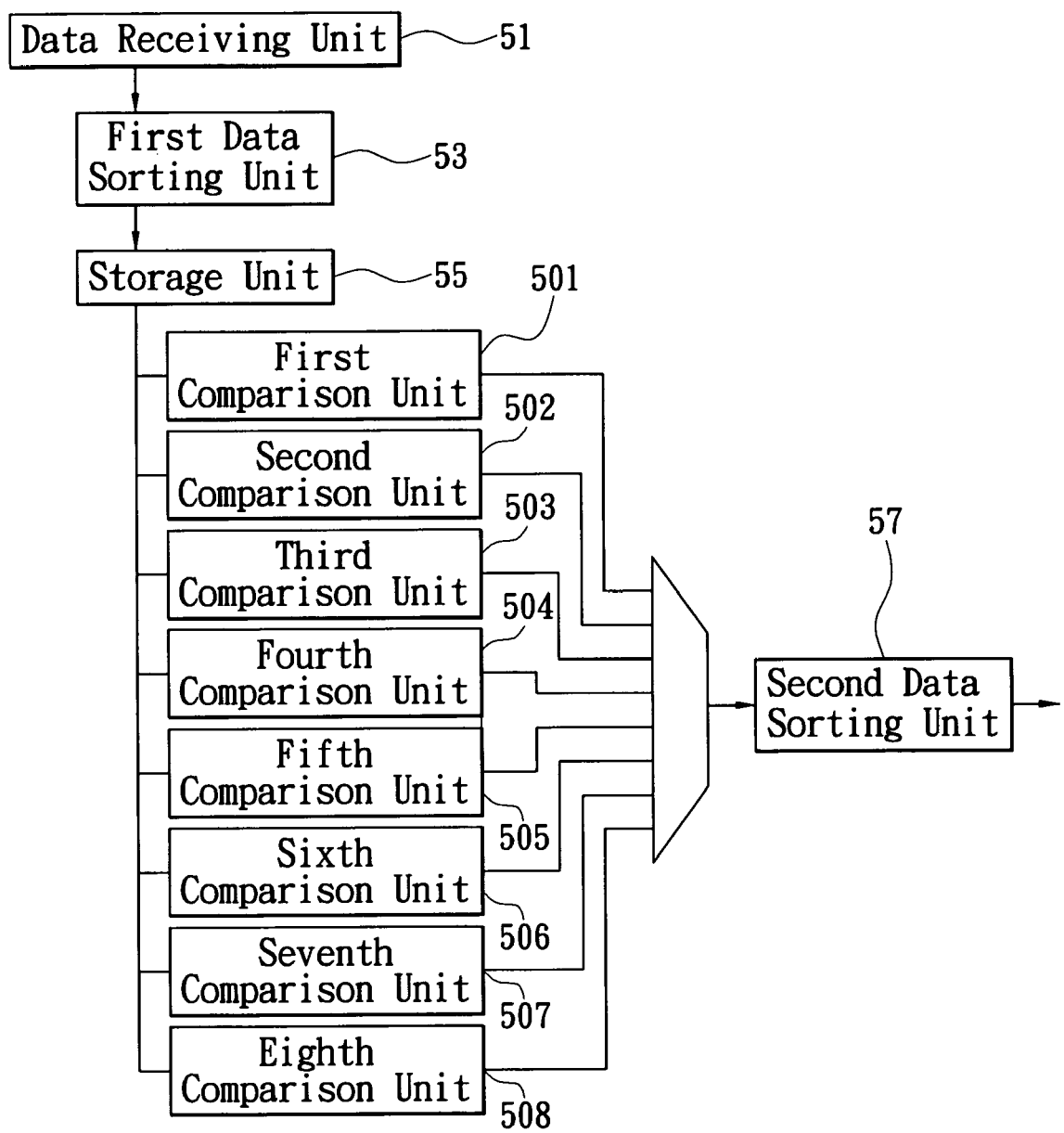
FIG. 5 is a diagram of an embodiment of the invention method for determining synchronization code under SMIA.

To implement the workflow illustrated in FIG. 4, the present invention provides an embodiment for the invention method of determining synchronization code under SMIA, as shown in FIG. 5.

The data receiving unit 51 receives the data signal between mobile devices under SMIA, and since the image under SMIA is transmitted in a data type of LSB first, thus, as soon as entering into the decoder, it will be converted into a data type of MSB first. While the present invention is directed to the synchronization code with LSB first for performing comparison operation, it is necessary to execute order transformation by the first data sorting unit 53 shown in the figure, generating the data type of LSB first, then temporarily stored into the storage unit 55.

Thereafter, perform the first comparison operation on the LSB first data by the first comparison unit 501, deciding whether the LSB first data matches the offset set in the first comparison unit; if not, then send the data to the second comparison unit 502 for performing the second comparison operation. Similarly, if not, send the data to the third comparison unit 503 for performing the third comparison operation, etc., and at most through the comparison operations from the fourth comparison operation in the fourth comparison unit 504, the fifth comparison operation in the fifth comparison unit 505, the sixth comparison operation in the sixth comparison unit 506, the seventh comparison operation in the seventh comparison unit 507 and the eighth comparison operation in the eighth comparison unit 508. Once the position of the synchronization code with LSB first is located, the subsequent operations will be skipped, indicating the correct position is found, which means the acquisition of correctly translated bit flow. Finally, convert the LSB first data into data of general type by means of the second data sorting unit 57, i.e. the data type of MSB first.

Figure 6:
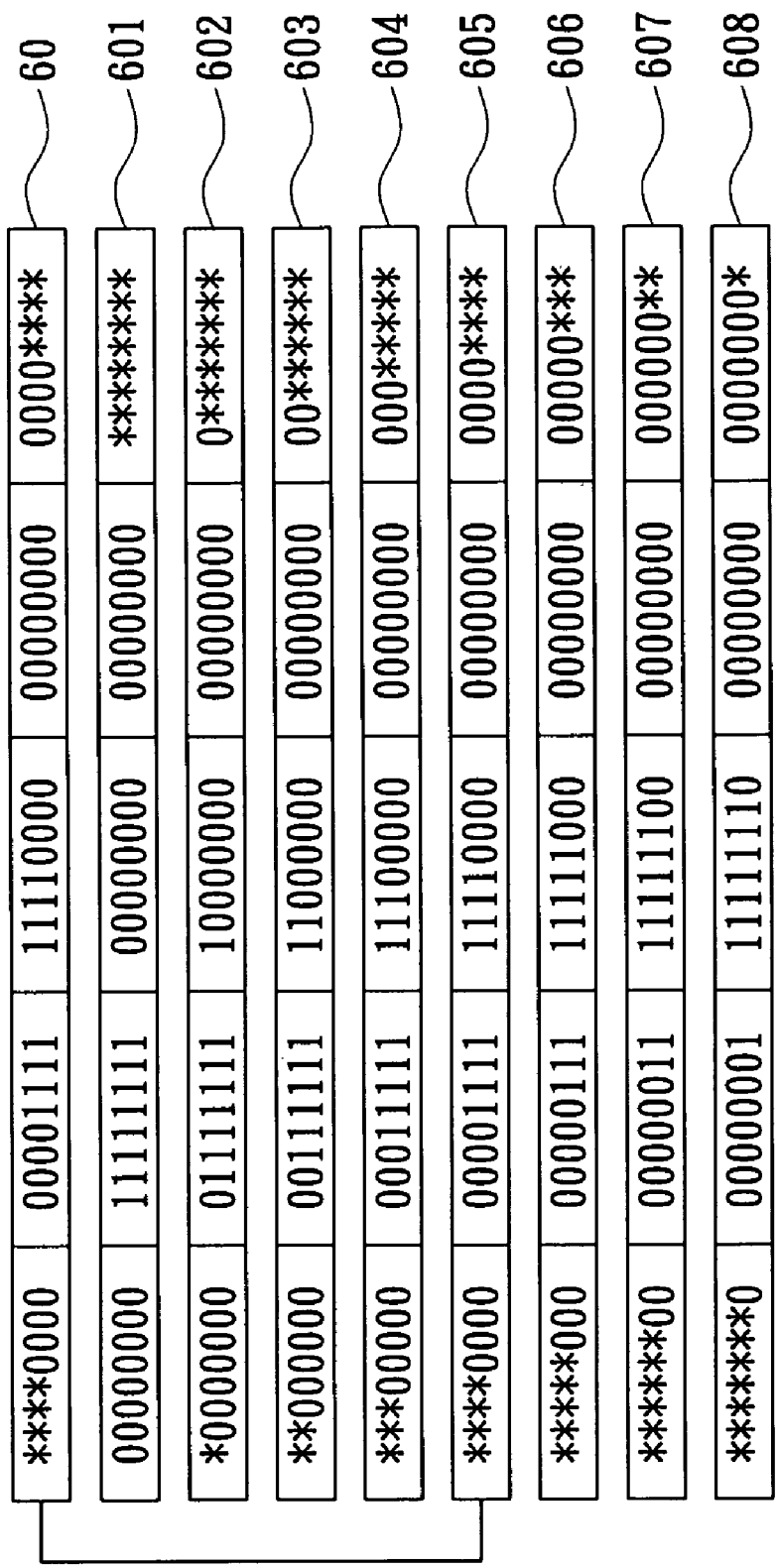
FIG. 6 is a bit value diagram of the comparison operations used by the present invention.

FIG. 6 shows a bit value diagram of the comparison operations used by the present invention. Suppose the synchronization code with LSB first should be 4 bytes, such as 00000000 11111111 00000000 00000000. However, due to data error, or some error in the synchronization code specifying the image data, the received synchronization code with LSB first may generate an offset of 4 bits, which thus become 0000 00001111 11110000 00000000 0000 spanning over 5 bytes. Therefore, the present invention needs to provide comparators accommodating at least 5 byte data, or employing comparison operations with at least 5 bytes.

For example, if the received synchronization code with LSB first has an offset of 4 bits, such as **0000 00001111 11110000 00000000 0000** shown in data 60. At this moment, the bit values used by each comparator or comparison operation are required to be as below, wherein * represents the portion without value:

for data 601 used in the first comparison operation:
00000000 11111111 00000000 00000000 ********
for data 602 used in the second comparison operation:
*0000000 01111111 10000000 00000000 0*******
for data 603 used in the third comparison operation:
000000 00111111 11000000 00000000 00****
for data 604 used in the fourth comparison operation:
*00000 00011111 11100000 00000000 000***
for data 605 used in the fifth comparison operation:
**0000 00001111 11110000 00000000 0000**
for data 606 used in the sixth comparison operation:
***000 00000111 11111000 00000000 00000* for data 607 used in the seventh comparison operation:
****00 00000011 11111100 00000000 000000
for data 608 used in the eighth comparison operation:
*******0 00000001 11111110 00000000 0000000*

As can be seen from the above bit values used by each comparison operation, every situation of different offsets has been fully contemplated. In actual operation, it will first go through the first comparison operation; if it does not match the received bit value, then perform the second comparison operation which offsets one bit, and so on, until the correct result is obtained and stop the rest of operations.

In summary, the inventive method of determining synchronization code under SMIA considers the conditions of synchronization code offset generated upon the occurrence of data error during transmission, hence by using iterative comparison operation to find the correct synchronization code position, thus obtaining the correctly translated data.

The above-mentioned descriptions represent merely the preferred embodiment of the present invention, without any intention to delineate the scope of the present invention thereto. Therefore, all equivalent changes, alternations or modifications in structure made by utilizing, or based on, the disclosed specification and appended figures of the present invention are reasonably considered to fall within the scope of the present invention.

What is claimed is:

1. A method of determining a location of a synchronization code under Standard Mobile Image Architecture (SMIA), comprising:
   upon receiving a most significant bit (MSB) of an image data rearranging the received image data to form a first data having a Least Significant Bit (LSB) of the image data as a first bit of the first data;
   storing to a storage unit; and
   performing a comparison operation by sequentially and repeatedly comparing the first data with a plurality of predetermined sets of synchronization codes, each of which is associated with a predetermined offset, so as to determine whether the first data matches any of the predetermined sets of the synchronization codes until identifying a match between the first data and the predetermined set of the synchronization codes.

2. The method of determining the location of the synchronization code under SMIA according to claim 1, when identifying the match between the data and the predetermined set of the synchronization codes further comprising rearranging the first data to prepare a second data with the MSB of the first data as a first bit of the second data.

3. The method of determining the location of the synchronization code under SMIA according to claim 2, further comprising outputting the second data after identifying the match between the first data and the predetermined set of the synchronization codes and rearranging the first data into the second data.

4. The method of determining the location of the synchronization code under SMIA according to claim 2, wherein the first data, the second data, and the predetermined set of the synchronization codes are 8 bits in length.

5. The method of determining the location of the synchronization code under SMIA according to claim 4, further comprising ranging the offset from 0 bit to 7 bits when the first data, the second data, and the predetermined set of the synchronization codes are 8 bits in length.

6. The method of determining the location of the synchronization code under SMIA according to claim 5, wherein identifying the match between the predetermined set of the synchronization codes and the first data is accomplished by performing no more than 8 comparison operations.

7. A method of determining a location of a synchronization code under Standard-Mobile Image Architecture (SMIA) in a decoder, comprising:
   upon receiving an image data having a most significant bit as a first bit thereof rearranging the received image data to form a first data having a least significant data of the image data as a first bit of the first data;
   passing the first data to a first comparison unit associated with a first predetermined set of synchronization codes having a first predetermined offset, for performing a first comparison operation by comparing the first data with the first predetermined set of the synchronization codes;
   determining whether there is a match between the first data and the first predetermined set of the synchronization codes; and
   if there is not match between the first data and the first predetermined set of the synchronization codes passing the first data to a second comparison unit associated with a second predetermined set of synchronization codes having a second predetermined offset, for performing a second comparison operation by comparing the first data and the second predetermined set of the synchronization codes.

8. The method of determining the location of the synchronization code under SMIA according to claim 7, further comprising preparing a second data having the MSB of the first data as a first bit of the second data after determining the first data matches the first predetermined set of the synchronization codes or the second predetermined set of the synchronization codes.

9. The method of determining the location of the synchronization code under SMIA according to claim 8, further comprising outputting the second data.

10. The method of determining the location of the synchronization code under SMIA according to claim 8, wherein the first data, the second data, the first predetermined set of the synchronization codes, and the second predetermined set of the synchronization codes are 8 bits in length.

11. The method of determining the location of the synchronization code under SMIA according to claim 10, further comprising ranging the first predetermined offset and the second predetermined offset from 0 bit to 7 bits.

* * * * *